United States Patent [19]
Glitho et al.

[11] Patent Number: 5,999,973
[45] Date of Patent: Dec. 7, 1999

[54] USE OF WEB TECHNOLOGY FOR SUBSCRIBER MANAGEMENT ACTIVITIES

[75] Inventors: Roch Glitho, Montreal; Francois Leduc, Pincourt, both of Canada; Thomas Crowe, Tipperary, Ireland; Lena Hogberg, Stockholm, Sweden

[73] Assignee: Telefonaktiebolaget L M Ericsson (publ), Stockholm, Sweden

[21] Appl. No.: 09/041,561

[22] Filed: Mar. 12, 1998

Related U.S. Application Data

[60] Provisional application No. 60/042,077, Mar. 28, 1997.

[51] Int. Cl.$^6$ .................................................... G06F 15/16
[52] U.S. Cl. ............................................. 709/223; 707/3
[58] Field of Search ................................... 709/223, 224, 709/201, 203, 238, 250, 225, 229, 217; 707/1, 3, 9, 10; 711/118; 710/200, 36; 713/201; 370/351, 401, 409

[56] References Cited

U.S. PATENT DOCUMENTS

| | | | |
|---|---|---|---|
| 5,396,543 | 3/1995 | Beeson, Jr. et al. | 379/59 |
| 5,440,620 | 8/1995 | Slusky . | |
| 5,455,953 | 10/1995 | Russell | 395/739 |
| 5,537,594 | 7/1996 | Shannon et al. | 395/650 |
| 5,581,764 | 12/1996 | Fitzgerald et al. . | |
| 5,610,974 | 3/1997 | Lantto | 379/59 |
| 5,642,515 | 6/1997 | Jones et al. | 395/727 |
| 5,768,509 | 6/1998 | Gunluk | 395/200.33 |
| 5,790,868 | 8/1998 | Hotea et al. | 395/726 |
| 5,878,347 | 3/1999 | Joensen et al. | 455/433 |
| 5,901,352 | 5/1999 | St.Pierre et al. | 455/426 |
| 5,926,468 | 7/1999 | Chapman et al. | 370/328 |

FOREIGN PATENT DOCUMENTS

| | | |
|---|---|---|
| 0 483 547 | 10/1991 | European Pat. Off. . |
| 0 627 686 | 5/1994 | European Pat. Off. . |
| 0 748095 | 12/1996 | European Pat. Off. . |
| WO 96/28942 | 9/1996 | WIPO . |
| WO 96/35301 | 11/1996 | WIPO . |
| WO 96/39770 | 12/1996 | WIPO . |
| WO 97/01903 | 1/1997 | WIPO . |
| WO 97/44943 | 11/1997 | WIPO . |

OTHER PUBLICATIONS

PCT Search Report, dated Sep. 11, 1998, PCT/SE98/00519.
Jacqueline Aronsheim–Grotcsh, "Customer Network Management CNM", Apr. 15, 1996, 1996 IEEE Network Operation and Management Symposium, Apr. 1, 1996, vol. 2, pp. 339–368.
Amy Larson, "The Next Web Wave: Network Management", Data Communications, Jan, 1996.

*Primary Examiner*—Mehmet B. Geckil
*Attorney, Agent, or Firm*—Jenkens & Gilchrist, PC

[57] ABSTRACT

External entity data access to the customer administrative system and database network elements of a telecommunications network is provided through a web-server and an Internet connection. The integrity and security of any stored data is protected through the use of a firewall implemented at the web-server. In one aspect, an interface is connected between the customer administrative system and database network elements and is also connected to the web-server to handle external entity requests by specifying not only which actions need to be taken but also routing the request to a proper destination. In a second aspect, the interface is by-passed with respect to the handling of external entity requests, with the web-server specifying the actions to be taken and routing the request to the proper destination.

15 Claims, 1 Drawing Sheet

USE OF WEB TECHNOLOGY FOR SUBSCRIBER MANAGEMENT ACTIVITIES

CROSS REFERENCE TO RELATED APPLICATION

The present application for patent is related to, and claims priority from, U.S. Provisional Application for Patent Serial No. 60/042,077, filed Mar. 28, 1997, now abandoned, entitled "Use of Web Technology for Subscriber Management" by Roch Glitho, et al. The disclosure of U.S. Provisional Application for Patent Serial No. 60/042,077 is hereby incorporated by reference.

BACKGROUND OF THE INVENTION

1. Technical Field of the Invention

The present invention relates to wireless telecommunications systems and, in particular, to the use of web (i.e., Internet) technology to access and manage data stored in a customer administrative system (CAS) and/or a network element such as a home location register (HLR) database or a wireless service control node (WSCN).

2. Description of Related Art

Reference is now made to FIG. 1 wherein there is shown a block diagram of a portion of a telecommunications network 10 implementing an interface (IF) 12 between a customer administrative system (CAS) 14 and a plurality of database network elements (NE) 16. The interface 12, customer administrative system 14, and database network elements 16 are interconnected using a network 18 preferably comprising a network, such as an X.25 network, separate and apart from the telecommunications network 10. The telecommunications network 10 comprises a wireless (for example, cellular) communications system, and the database network elements 16 comprise, for example, a home location register (HLR) or a wireless service control node (WSCN). The home location register/wireless service control node functions in a database fashion to store permanent and temporary wireless subscriber data. The permanent data stored in the home location register/wireless service control node comprises fixed information concerning the communications service subscripted to by each subscriber. The temporary data stored in the home location register/wireless service control node comprises variable information concerning the current location of each subscriber. With respect to the wireless service control node, further functional operations are supported in connection with the provided of subscriber services (such as intelligent network services).

The customer administrative system 14 is utilized to engage in transactions relating to the administration of the permanent data stored in each database network element 16. These administration activities, in general, relate to transactions performed for the purposes of user (i.e., subscriber) creation or definition, service activation, and the like, relating to a given user. More particularly, the transactions relate to subscriber data administration tasks such as:

subscription initiation/removal/status, subscriber activation/cancellation, service provision/withdrawal/activation/passivation, C-number (transfer) definition, pass code changes, and serial number changes.

The transactions may further relate to authentication administration tasks such as authentication activation/change/deactivation/status. Additionally, the transactions relate to numbering plan configuration including number range assignment, numbering plan deletion and numbering plan viewing.

A service operator is the entity that implements and maintains the infrastructure comprising the telecommunications network 10. The service operator typically utilizes licensed retailers to market and sell subscriptions for telecommunications services to individual users (i.e., the subscribers). The service operator may further sell blocks of subscriptions to yet another entity referred to as a service provider. The service provider then markets and leases/sells these subscriptions (perhaps also through the use of its own retailers) on an individual or group basis to end user subscribers.

Access to and management of the data stored in the customer administrative system 14 and the database network elements 16 is typically restricted to the service operator. In this regard, the service operator takes responsibility through its customer administrative system 14 for controlling the transactions discussed above relating to the administration of the permanent data stored in each database network element 16. Now that more and more service providers are purchasing blocks of subscriptions for their own management, there is an interest in granting the service provider access to the customer administrative system 14 and each database network element 16 for transactions and/or limited or restricted data entry, review and modification purposes in connection with the permanent data administration tasks. Similarly, in connection with the establishment of new subscriptions, retailers also desire access to the customer administrative system 14 and each database network element 16 for transactions and/or limited or restricted data entry, review and modification purposes. Furthermore, the users themselves desire access to their home database network element 16 for transactions and/or limited or restricted data entry, review and modification purposes in connection with maintenance of certain aspects of the permanent data comprising their subscription (such as, for example, their forward-to, speed dialing, and call screening lists).

Concerns over maintaining the integrity and security of the data stored in the customer administrative system 14 and each database network element 16 must be addressed before these kinds of external entity accesses are granted. Furthermore, an economical and user friendly mechanism is needed to provide the service providers, retailers and users with transaction-related data access to the customer administrative system 14 and each database network element 16.

SUMMARY OF THE INVENTION

The present invention addresses the foregoing concerns relating to transaction-related data access to and maintaining the integrity and security of data stored in the customer administrative system and database network elements by permitting external entity data access through a web-server and an Internet connection. Sufficient security measures are implemented at the web-server (for example, through the use of a firewall) to restrict external entity rights to access and modify stored data. In a first embodiment, an interface supporting transaction logic, redundancy logic, query oriented logic and data migration logic functionalities is connected between the customer administrative system and database network elements and also to the web-server. All external entity originated data transactions, queries and modifications pass through the interface, with the logic therein utilized to specify, based on the received external entity request, the action or actions that need to be taken to implement the request, and further for proper routing of the request to the appropriate one or ones of the customer administrative system and database network elements for handling. In a second embodiment, the web-server maintains a direct connection to each of the customer administrative system and database network elements thus effectively by-passing the interface with respect to the handling of external entity requests. The transaction logic, redundancy logic, query oriented logic and data migration logic functionalities are then also maintained in the web-server to specify based on the received request the actions to be taken, and to route the request accordingly.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 1:
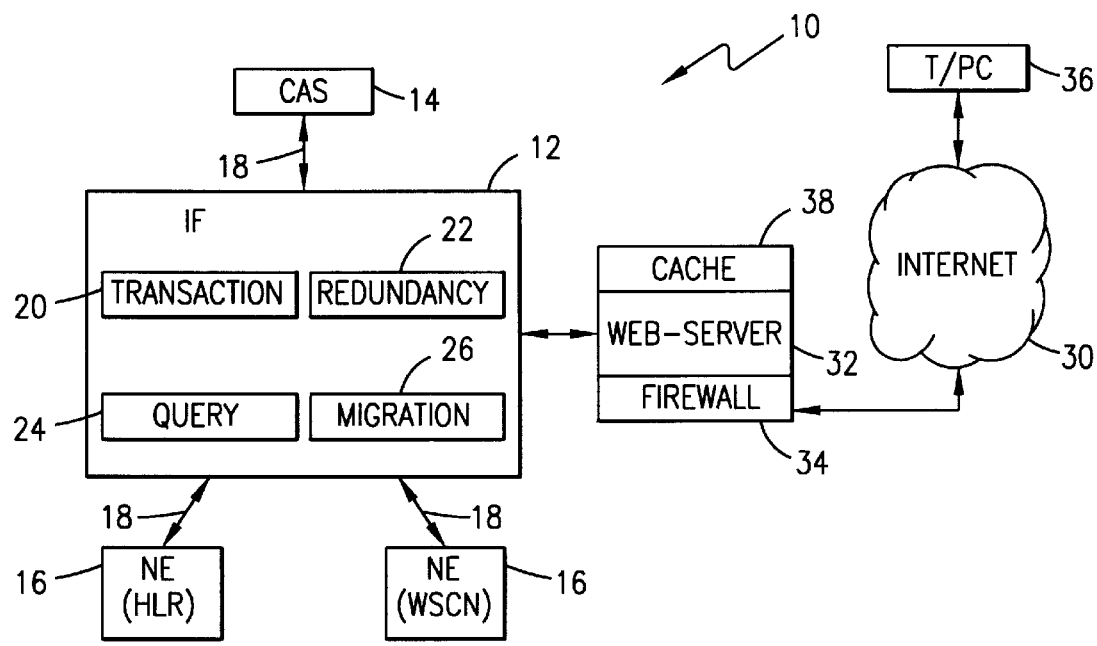
FIG. 1 is a block diagram of a portion of a telecommunications network illustrating a first embodiment of present invention.

Continued reference is now made to FIG. 1 for a description of a first embodiment of the present invention.

The interface 12 functions as a service order gateway (SOG) or service management access layer (SMAL) with respect to managing data access among and between the customer administrative system 14, the database network elements 16 and external entities (to be described).

In one aspect, the interface 12 utilizes a transaction logic 20 to support the customer administrative system 14 and external entity operations and transactions concerning the administration of subscriber data (relating to subscriptions, services and the like), authentication data and numbering plan data. This transaction logic 20 receives orders originated at the customer administrative system 14 or external entity, identifies the particular action(s) to be taken by the customer administrative system 14 or a database network element 16 in connection with that order, identifies the commands needed to effectuate those actions, converts those commands to a proper format for communication to and/ understanding by the customer administrative system or that database network element, and issues the properly formatted commands. The transaction oriented logic 20 further receives any response to the order from the customer administrative system 14 or identified database network element 16, converts the response (if necessary) to a proper format for communication to and/understanding by the customer administrative system 14 or external entity that originated the order, and routes the properly formatted response thereto.

In another aspect, the interface 12 utilizes a redundancy logic 22 to support automated redundancy of customer administration system 14 administered (and perhaps external entity specified) subscriber data (relating to subscriptions, services and the like), authentication data and numbering plan data among and between the customer administrative system 14 and the database network elements 16. This redundancy logic 22, operating in conjunction with transaction logic 20, functions to identify for each received subscriber data order the customer administrative system 14 and/or plural database network elements 16 that are affected by the order (i.e., both the primary and redundant database network elements), identify the particular action(s) to be taken by the customer administrative system and/or each database network element in connection with that order, identify the commands needed to effectuate those actions, convert each of those commands to a proper format for communication to and/understanding by the customer administrative system and/or the identified database network elements, and issues the commands to each of those nodes. To support this redundancy operation, the redundancy logic 22 keeps track of the inter-relationships between the plural database network elements 16 concerning administered subscriber data, authentication data and numbering plan data. The redundancy logic 22 accordingly recognizes for each subscriber which of the plural database network elements 16 comprises the primary database network element, and which of the plural database network elements comprises the redundant database network elements. For each order, the appropriate ones of the plural database network elements 16 are identified and issued appropriately formatted commands. Similarly, the redundancy logic 22 recognizes which instances of redundant administration of subscriber data require updating of the customer administrative system 14, and issues appropriately formatted commands.

In yet another aspect, the interface 12 further utilizes a query oriented logic 24 to support the querying of the customer administrative system 14 and/or the plurality of database network elements 16 regarding the stored permanent information. These queries involve operation to search the permanent data stored in the customer administrative system 14 and/or each database network element 16. This query oriented logic 24 receives search requests, determines which one or ones of the customer administrative system 14 and database network elements 16 need to be queried to complete the search request, converts those requests into queries having a proper format for communication to and/ understanding by each individual one of the necessary customer administrative system and database network elements, and routes properly formatted queries to the necessary customer administrative system and database network element for handling. Following customer administrative system 14 and/or database network element 16 handling of the query, search results are returned back to the interface 12. The query oriented logic 24 then collects the data of the returned search results in a file, signals the requesting entity which originated the search request, and engages in a file transfer of the data (properly formatted) with that originating requesting entity.

In still another aspect, the interface 12 utilizes a data migration logic 26 to support the transfer of subscriber data among and between the customer administrative system 14, the database network elements 16 and external entities. This data migration logic 26 receives migration requests, determines which nodes (such as, for example, certain ones of the database network elements 16) comprise the source and destination nodes for the migration, generates migration commands having a proper format for communication to and/understanding by each individual one of the necessary nodes, and routes the properly formatted commands to the necessary nodes for handling.

A more complete description of the transaction logic 20, redundancy logic 22, query oriented logic 24 and data migration logic 26 of the interface 12 may be obtained by reference to the following commonly assigned, co-pending patent applications:

CUSTOMER ADMINISTRATIVE SYSTEM MANAGEMENT OF REDUNDANT DATABASE NETWORK ELEMENTS IN A TELECOMMUNICATIONS SYSTEM, Ser. No. 08/976,210, filed Nov. 21, 1997;

QUERY SUPPORTING INTERFACE BETWEEN A CUSTOMER ADMINISTRATIVE SYSTEM AND DATABASE NETWORK ELEMENTS OF A TELECOMMUNICATIONS SYSTEM, Ser. No. 08/975,631, filed Nov. 21, 1997; and MIGRATION OF SUBSCRIBER DATA BETWEEN HOME LOCATION REGISTERS OF A TELECOMMUNICATIONS SYSTEM, Ser. No. 08/975,632, filed Nov. 21, 1997, the disclosures of which are hereby incorporated by reference.

External entity access to the telecommunications network 10 and, in particular, the interface 12 is provided through the Internet 30 and a web-server 32. The interface 12 is connected to the web-server 32 through a TCP/IP type of connection. The web-server 32 is connected to the Internet 30 through a TCP/IP type of connection. The web-server supports both hyper-text transfer protocol (HTTP) and secure hyper-text transfer protocol (S-HTTP) access over the Internet 30. A firewall 34 is utilized to provide front end security protection against all accesses to the interior network (i.e., the telecommunications network 10 including the customer administrative system 14 and the database network elements 16) except for those designated and authorized as legitimate service accesses.

The external entities at issue herein comprise service providers, retailers and users. Utilizing a terminal (T) or personal computer (PC) 36 having dial-up Internet 30 access capabilities and web-browser software, the service provider, retailer or user may obtain, through the web-server 32, limited and restricted transaction-related data access to the customer administrative system 14 and each database network element 16 of the network 10. The web-server 32 is accordingly provided with a world-wide-web (WWW) address in order to support Internet access. With this data access, and further through use of the transaction logic 20, query oriented logic 24 and data migration logic 26 provided by the interface 12, the service provider, retailer or user may engage in permitted data transactions, query for stored information, and specify data migrations. The redundancy logic 22 of the interface 12 further insures that back-up copies of the data affected by service provider, retailer or user data access are appropriately made and distributed throughout the nodes for storage. It is, of course, understood that the various functionalities provided by the transaction logic 20, query oriented logic 24 and data migration logic 26 may not be available for use by each of the service provider, retailer or user. The firewall 34 and web-server 30 accordingly function in tandem to control the nature of permitted external entity data access to the network 10, and thus restrict each of the service provider, retailer or user to only permitted types of accesses and actions.

The firewall 34 implements a "screened subnet" type of architecture. Screened subnet type firewalls utilizing a pair of packet filters and a bastion host (all interconnected through a subnet) are well known to those skilled in the art. Utilizing this firewall architecture, the host platforms for the interface 12 and the web-server 32 are advantageously detached from each other. This firewall supported routing mechanism provides enhanced security. In the event one of the components becomes compromised, the remaining components continue to provide a line of defense against unauthorized intrusion into the network 10 through the Internet 30.

The web-server 32 is programmed to support one or more types of external entity access to the network 10. Each type of access provides a different level of security. Furthermore, the programming may specify that different classes of external entities be given different types of access. For example, a user may be given the most restricted access to network over the Internet 30. Conversely, a service provider may be given almost unrestricted access to the network. The programming further specifies the level of data access to be given to the different classes of external entities. Again, for example, the user may be restricted to a very limited right to access, modify and create data stored on the network 10. The service provider, on the other hand, may not be so restricted.

A first type of network access comprises an "off-line" access. The basic operating scheme of the off-line access system is that when an external entity makes a data access request over the Internet 30, the request is temporarily logged in the web-server 32. The external entity receives a return message indicating that the request has been logged and will be processed as soon as possible (assuming, of course, that the external entity is authorized for the level of data access required to implement their request). Once the connection with the external entity over the Internet 30 is broken, the temporarily logged request is communicated to the interface 12 for handling by the appropriate one or ones of the transaction logic 20, redundancy logic 22, query oriented logic 24 and data migration logic 26. This access solution has an advantage of providing significant security to the network 10. However, the solution does have a number of drawbacks including the web-server 32 in this type of network access does not support simultaneous connection to the external entity and the information stored in the customer administrative system 14 and the database network elements 16. Accordingly, external entities cannot view this information through their web browser software before specifying data changes or modifications.

A second type of network access comprises an "off-line with cache" access. The basic operating scheme of the off-line with cache access system is the same as with the off-line system described above, with the exception that certain customer administrative system 14 and database network element 16 stored data of popular interest to external entities is stored in parallel by the web-server 32 using a cache 38. With this solution, the external entity is able to view the cached portion of the information stored in the customer administrative system 14 and the database network elements 16 during their Internet 30 access session, and further review and consider this information in connection with the making of their data access request. Another benefit of this solution is the maintenance of a significant level of security to the network 10 (comparable to that provided with the off-line system described above). However, the solution does have a number of drawbacks including: requiring service management command activities affecting the stored data to be duplicated in the network nodes as well as in the cache; synchronizing external entity data management functions with telecommunications network functions; and, providing the web-server 32 with sufficient processing capabilities to handle not only external entity communications but also the updating of the cache 38.

A third type of network access comprises an "on-line" access. The basic operating scheme of the on-line access system is to give the external entity interactive, real-time access to the data stored customer administrative system 14 and database network element 16. When an external entity makes a data access request over the Internet 30, the request is passed on through the web-server 32 to the interface 12 (assuming, of course, that the external entity is authorized for the level of data access required to implement their request). The interface 12 then handles the received request using an appropriate one or ones of the transaction logic 20, redundancy logic 22, query oriented logic 24 and data migration logic 26. Following handling as necessary, a reply is generated for communication back through the web-server 32 to the external entity.

The on-line access system accordingly allows for the establishment of a communications channel over the internet and through to the data storage and management nodes of the network. This architecture raises significant concerns regarding the provision of adequate security measures to protect against unauthorized data access. Use of the firewall 34 becomes an absolute requirement. In addition, other measures, such as filtering of requests, restricted zone architectures for the web-server and interface, low permission levels, and security measures for the host platforms, are implemented to increase security. Other concerns with the on-line system relate to performance issues such as the web-server handling more pending requests due to the delay between request receipt and issuance of the reply, and bandwidth concerns relating to the communications links among and between the interface 12, customer administrative system 14 and database network element 16.

A fourth type of network access comprises a "hybrid on-line/off-line" access. The basic operating scheme of the hybrid on-line/off-line system is to allow on-line fetching of data from the customer administrative system 14 and database network elements 16 using the query oriented logic 24 of the interface 12 in response to external entity requests in a manner similar to the on-line system described above. In the event that the web-server further supports the use of a cache 38, the cache is checked by the web-server 32 in response to an external entity request before implementing the query oriented logic 24 of the interface 12. All other data accesses to the customer administrative system 14 and database network elements 16 for the purpose of accessing, modifying and creating data using the transaction logic 20, redundancy logic 22 and data migration logic 26 occur in a manner similar to the off-line system described above.

Figure 2:
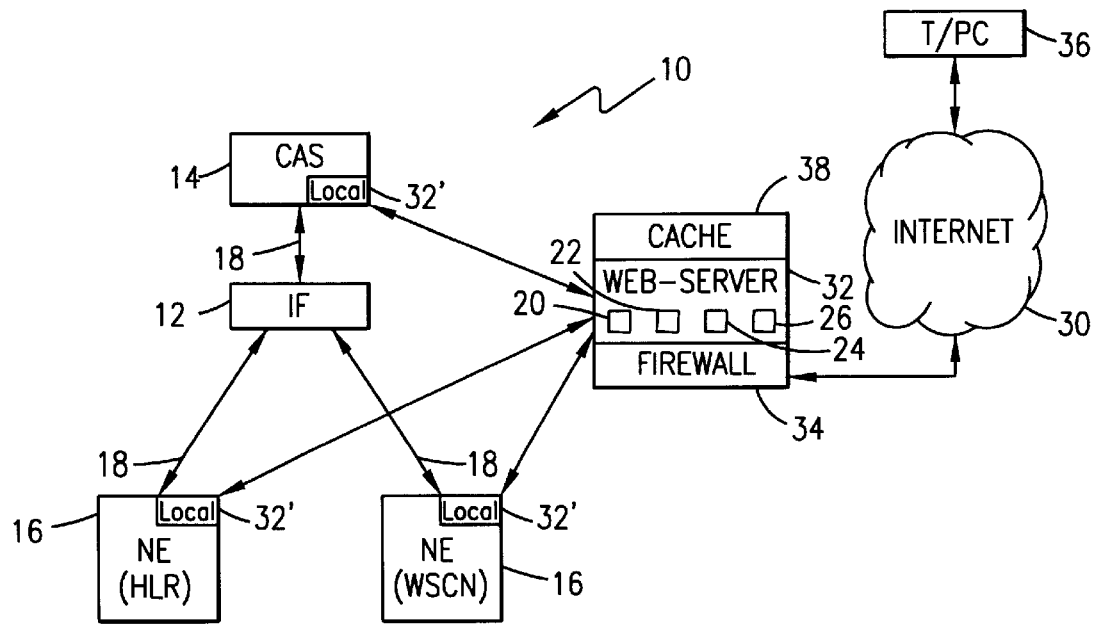
FIG. 2 is a block diagram of a portion of a telecommunications network illustrating a second embodiment of present invention.

Reference is now made to FIG. 2 wherein there is shown a block diagram of a portion of a telecommunications network illustrating a second embodiment of present invention. In this embodiment, the interface 12 is by-passed concerning external entity data management operations, and the web-server 32 (using its firewall 34) is connected directly to each of the customer administrative system 14 and database network elements 16 through a local web-server 32'. It is, of course, understood that the interface 12 remains in place with its requisite functionality (20, 22, 24 and 26, not shown, see FIG. 1) to handle transactions originated at the customer administrative system 14, and further to respond, as necessary, to an external entity actions taken directly with the customer administrative system 14 and database network elements 16. The web-server 32 may also implement one or more of the transaction logic 20, redundancy logic 22, query oriented logic 24 and data migration logic 26, as necessary and as shown, to support external entity requests and network 10 operation. The web-server 32 is connected to the local web-server 32' for each of the customer administrative system 14 and database network elements 16 through a TCP/IP type of connection. With this configuration, the interface 12 is no longer utilized to route external entity requests and data management activities among and between the customer administrative system 14 and database network elements 16. Routing is handled by the web-server 32, and processing of the requests to generate responses is handled by the local web-servers 32'.

As there are multiple destinations in the second embodiment for external entity Internet access (i.e., the customer administrative system 14 and each of the database network elements 16) a different WWW address may be provided for each destination. There is, however, a convenience advantage to maintaining only the single WWW address (for example, the address of the web-server 32 (as described above)) for external entity Internet access. Accordingly, proper routing of external entity requests and data management activities concerning that single address to the customer administrative system 14 and each of the database network elements 16 is supported using Javascript and an intelligent proxy in the firewall 34.

The advantages of the architecture of the second embodiment include: one mapping from hyper-text mark-up language (HTML) to the access protocol of the customer administrative system 14 and database network element 16 nodes; local web-server 32' provided by vendor in conjunction with the network node; the web-related communications channels are separated from the telecommunications network 10; and, no need for the presence of an interface 12. The disadvantages of this implementation include: duplicative routing; and, added cost due to the need for local web-servers 32'.

A more complete understanding of the operation of the present invention in supporting external entity data management activities using web technology may be obtained through examination of the following exemplary situations. First, consider the cellular telephone user. A significant amount of subscriber entered and controlled data is stored in the database network elements 16. Conventional telecommunications network 10 operation allows the user to review, modify and create this data, and perhaps engage in some transactions, through the cellular mobile station. The primarily numeric keypad of the cellular mobile station does not conveniently lend itself to accessing and entering this data. Similarly, the small display provided on the cellular mobile station does not conveniently lend itself to efficiently reviewing this data. Through the present invention, the user is given web access to this database network element 16 stored data. It is important to note here that the security protections afforded by the web-server 32 and firewall 34 prevent the user from gaining access to the customer administrative system 14, and limit database network element 16 access to only that user's subscription. Through the convenience of the user's personal computer, and Internet 30 connection is made with the web-server 32. Query requests may then be made to review this stored data. Furthermore, data management transactions may be ordered to create or modify the stored data. Examples of the data at issue with respect to users comprises forward-to lists, location based services data, speed dialing list, and the like.

Turning next to retailers, in connection with the sale of cellular services to a user, the retailer needs to input certain subscriber information into both the customer administrative system 14 and the database network element 16. The data input into the customer administrative system 14 comprises subscription related data such as the subscriber number (SNB), mobile subscriber number (MSNB), serial number (SRNB) and service related data. The data input into the database network element 16 comprises the same service related data as mentioned above with respect to user access. Retailer access to the customer administrative system 14 and the database network element 16 relating to other actions, activities and transactions, such as those discussed herein, may also be supported. Conventional telecommunications network 10 operation required the retailer to supply the necessary information in hard copy format directly to the service operator. Through the present invention, the retailer is given web access to the customer administrative system 14 and database network element 16 stored data for the user. It is important to note here that the security protections afforded by the web-server 32 and firewall 34 limit retailer access to the customer administrative system 14 and database network element 16 to only that necessary to establish or support user subscriptions. Through the convenience of the retailer's personal computer, and Internet 30 connection is made with the web-server 32. Query requests may then be made to review this stored data. Furthermore, data management transactions may be ordered to create or modify the stored data.

Turning next to the service provider, in connection with the purchase of blocks of subscriptions and the marketing of those subscriptions, the service provider needs to input certain subscriber information into both the customer administrative system 14 and the database network element 16. The data input into the customer administrative system 14 comprises subscription related data such as the subscriber number (SNB), mobile subscriber number (MSNB) and serial number (SRNB). Service provider access to the customer administrative system 14 relating to other actions, activities and transactions may also be supported. Data input by the service provider into the database network element 16 would not typically be allowed. However, access to the database network element for other actions, such as activations, may be permitted. Conventional telecommunications network 10 operation required the service operator to supply the necessary information in hard copy format directly to the service operator. Through the present invention, the service provider is given web access to the customer administrative system 14 and database network element 16 stored data for its block of subscriptions. It is important to note here that the security protections afforded by the web-server 32 and firewall 34 limit service provider access to the customer administrative system 14 and database network element 16 to only that necessary to establish or support its purchased block of subscriptions. Through the convenience of the service provider's personal computer, and Internet 30 connection is made with the web-server 32. Query requests may then be made to review this stored data. Furthermore, data management transactions may be ordered to create or modify the stored data.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. In a telecommunications network having a network element for storing data relating to telecommunication services and subscribers, and a customer administrative system for engaging in transactions relating to the administration of the data stored in the network element, a system for supporting data access and management actions concerning the network element and customer administrative system, such actions being originated by entities external to the telecommunications network, the system comprising:

a web-server having a world-wide-web address and providing Internet connectivity for the communication of requests and responses between the external entities and the network element and customer administrative system; and an interface connected to the web-server and connected between the network element and customer administrative system to handle routing of external entity requests for data access and management and responses thereto.

2. The system as in claim 1 wherein the network element comprises a home location register.

3. The system as in claim 1 wherein the network element comprises a wireless services control node.

4. The system as in claim 1 wherein the web-server includes a firewall for protecting the telecommunications network against unauthorized access from the Internet to the network element and customer administrative system.

5. The system as in claim 1 wherein the web-server supports off-line external entity access to the network element and customer administrative system for purposes of data access and management.

6. The system as in claim 5 wherein the web-server further includes a cache for storing a portion of the data stored in the network element and customer administrative system, and wherein the web-server further supports on-line review of the cache stored data with off-line modification to the data as stored in the network element and customer administrative system.

7. The system as in claim 1 wherein the web-server supports on-line external entity access to the network element and customer administrative system for purposes of data access and management.

8. In a telecommunications network having a network element for storing data relating to telecommunication services and subscribers, and a customer administrative system for engaging in transactions relating to the administration of the data stored in the network element, a system for supporting data access and management actions concerning the network element and customer administrative system, such actions being originated by entities external to the telecommunications network, the system comprising:

a web-server having a world-wide-web address and providing Internet connectivity for the communication of requests and responses between the external entities and the network element and customer administrative system; and a communications link connection between the web-server and each of the network element and customer administrative system, the web-server handling routing of external entity requests for data access and management and responses thereto over a proper communications link.

9. The system as in claim 8 wherein the network element comprises a home location register.

10. The system as in claim 8 wherein the network element comprises a wireless services control node.

11. The system as in claim 8 wherein the web-server includes a firewall for protecting the telecommunications network against unauthorized access from the Internet to the network element and customer administrative system.

12. The system as in claim 8 wherein the web-server supports off-line external entity access to the network element and customer administrative system for purposes of data access and management.

13. The system as in claim 12 wherein the web-server further includes a cache for storing a portion of the data stored in the network element and customer administrative system, and wherein the web-server further supports on-line review of the cache stored data with off-line modification to the data as stored in the network element and customer administrative system.

14. The system as in claim 8 wherein the web-server supports on-line external entity access to the network element and customer administrative system for purposes of data access and management.

15. The system as in claim 8 further including a local web-server for each of the network element and customer administrative system, the local web-server operating to process received requests and generate responses.

* * * * *